(12) United States Patent
Mehr et al.

(10) Patent No.: US 7,543,076 B2
(45) Date of Patent: Jun. 2, 2009

(54) MESSAGE HEADER SPAM FILTERING

(75) Inventors: John D. Mehr, Seattle, WA (US);
Nathan D. Howell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 11/174,843

(22) Filed: Jul. 5, 2005

(65) Prior Publication Data

US 2007/0011324 A1   Jan. 11, 2007

(51) Int. Cl.
*G06F 15/173* (2006.01)

(52) U.S. Cl. ............... 709/238; 709/206; 709/207; 709/235

(58) Field of Classification Search ......... 709/206–207, 709/238, 235, 283
See application file for complete search history.

(56) References Cited

U.S. PATENT DOCUMENTS

| | | | | |
|---|---|---|---|---|
| 5,394,394 A | * | 2/1995 | Crowther et al. | 370/392 |
| 5,778,002 A | * | 7/1998 | Werle | 370/474 |
| 2004/0068542 A1 | * | 4/2004 | Lalonde et al. | 709/206 |
| 2004/0260776 A1 | * | 12/2004 | Starbuck et al. | 709/206 |
| 2008/0159585 A1 | * | 7/2008 | True et al. | 382/100 |

* cited by examiner

*Primary Examiner*—Bunjob Jaroenchonwanit
*Assistant Examiner*—Hua Fan
(74) *Attorney, Agent, or Firm*—Lee & Hayes, PLLC

(57) ABSTRACT

Message header spam filtering is described. In an embodiment, a message is received that includes header entries arranged in an ordered sequence which indicates a path by which the message was communicated. The header entries are parsed to categorize each header entry as a header type where the header types are listed in the ordered sequence. A quantity of each different header type is determined, and a determination is made as to whether the message is likely a spam message based at least in part on the quantity corresponding to a particular header type. In another embodiment, a numeric representation of the ordered sequence is created where the numeric representation includes unique integers assigned to each different header type. A determination is made as to whether the message is likely a spam message based at least in part on the numeric representation of the ordered sequence of header types.

19 Claims, 7 Drawing Sheets

Header Entries  200

228 — Received: from cpimssmtpa47.msn.com ([10.48.181.221]) by cpimsstra09.email.msn.com with Microsoft SMTPSVC(5.0.2195.4905); Mon, 17 Jun 2002 04:59:27 -0700

226 — Received: from imo-d01.mx.aol.com ([205.188.157.33]) by cpimssmtpa47.msn.com with Microsoft SMTPSVC(5.0.2195.4905); Mon, 17 Jun 2002 04:59:26 -0700

224 — Received: from air-in03.mx.aol.com by imo-d01.mx.aol.com (mail_out_v32.21.) id 8.c7.2f9c1cd (16238) for <ffa401@themail.com>; Mon, 17 Jun 2002 07:05:52 -0400 (EDT)

222 — Received: from netscape.net (mow-d05.webmail.aol.com [205.188.138.69]) by air-in03.mx.aol.com (v86.12) with ESMTP id MAILININ32-0617070515; Mon, 17 Jun 2002 07:05:15 -0400

204 — Date: Mon, 17 Jun 2002 07:06:28 -0400
206 — From: c61402@netscape.net
208 — To: ffa401@themail.com
210 — Subject:  need extra cash?  try this
212 — MessageID:<0EBA80C0.73DCBBAA.00055A78 @netscape.net>XMailer: Atlas Mailer 2.0
214 — Content-Type: text/plain; charset=utf-8
216 — Content-Transfer-Encoding: 8bit
218 — Return-Path: c61402@netscape.net

Fig. 2

MESSAGE HEADER SPAM FILTERING

BACKGROUND

Electronic mail, also commonly referred to as "email" or "e-mail", is increasingly used as an electronic form of communication via the Internet. Email can be a useful and efficient way of communicating. Spam is unsolicited and/or undesirable email often sent to email distribution lists that include a large number of users' email addresses. Spam is similar to telemarketing and is the electronic equivalent of "junk mail" used to advertise products and services, request charitable donations, or to broadcast some political or social commentary. Spamming is the practice of sending an unsolicited email message to large numbers of email addresses. Such spam emails are often unwanted by the recipients, who may need to spend time a significant amount of time sorting through their email and deleting spam emails. In addition to consuming the recipient's time, such spam emails may interfere with the recipients normal email communications. Spam emails are also generally considered to be a waste of network bandwidth and can quickly fill-up file server storage space.

SUMMARY

Message header spam filtering is described herein.

In one implementation, a message is received that includes header entries arranged in an ordered sequence which indicates a path by which the message was communicated. The header entries are parsed to categorize each header entry as a header type where the header types are listed in the ordered sequence. A quantity of each different header type is then determined, and a determination is made as to whether the message is likely a spam message based at least in part on the quantity corresponding to a particular header type.

In another implementation, a message is received that includes header entries arranged in an ordered sequence which indicates a path by which the message was communicated. The header entries are parsed to categorize each header entry as a header type where the header types are listed in the ordered sequence. A numeric representation of the ordered sequence is then created where the numeric representation includes unique integers assigned to each different header type. A determination is made as to whether the message is likely a spam message based at least in part on the numeric representation of the ordered sequence of header types.

BRIEF DESCRIPTION OF THE DRAWINGS

The same numbers are used throughout the drawings to reference like features and components.

FIG. 2 illustrates an example of message header entries.

DETAILED DESCRIPTION

Message header spam filtering techniques are described herein as email header spam filtering to improve the accuracy of detecting spam messages (i.e., undesirable and/or unsolicited messages) such that the spam messages can be filtered from legitimate messages (i.e., desirable and/or solicited messages). Message header spam filtering improves the accuracy of spam filtering by analyzing the headers of messages themselves. As described in detail below, the header entries of a message are examined and categorized by type. The specific ordering and/or the quantity of the header entries are then analyzed using heuristics to determine the likelihood that a message is a spam message and/or to create new inputs to a spam filter.

While aspects of the described systems and methods for message header spam filtering can be implemented in any number of different computing systems, communication systems, environments, and/or configurations, embodiments of message header spam filtering are described herein in the context of the following exemplary system architectures.

Figure 1:
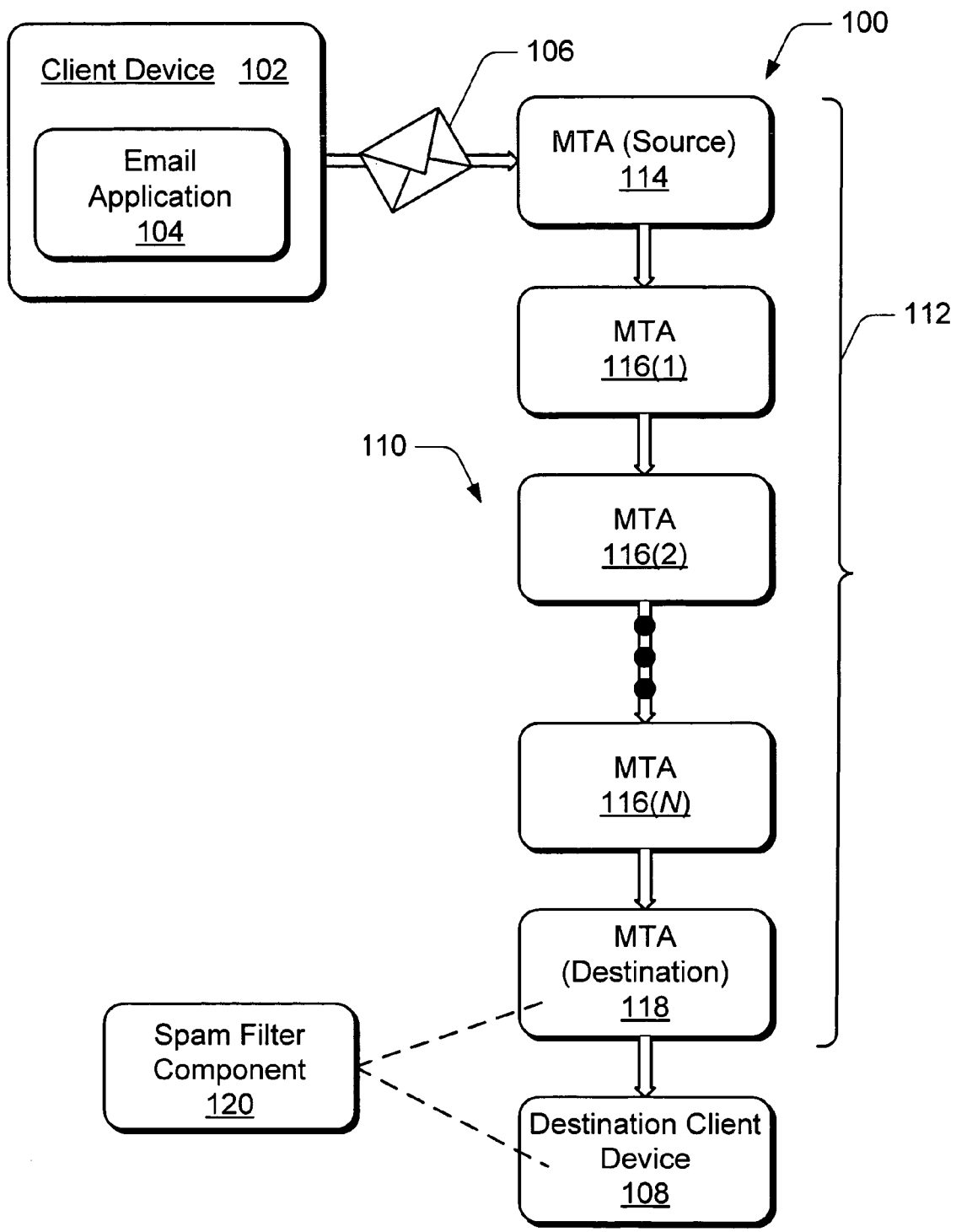
FIG. 1 illustrates an exemplary spam filtering system in which embodiments of message header spam filtering can be implemented.

FIG. 1 illustrates an exemplary spam filtering system 100 in which embodiments of message header spam filtering can be implemented. The spam filtering system 100 includes a client device 102 that has an email application 104 which generates and sends an email message 106 to a destination client device 108. The email message 106 is communicated from client device 102 to the destination client device 108 via a communication network 110 (such as an intranet, or the Internet).

The communication network 110 includes any number of mail transfer agents (MTA) 112 which may also be known as a mail server, a mail transport agent, a mail router, or an Internet mailer. A mail transfer agent 112 is an application that receives incoming email messages and then forwards the email messages as outgoing email for delivery. The first of the mail transfer agents 112 to receive the email message 106 from client device 102 is a source mail transfer agent 114. By way of example, the source mail transfer agent 114 can be a Simple Mail Transfer protocol (SMTP) server or an independent service provider (ISP) server which sends email messages for all of the client devices in a particular organization or enterprise.

After the email message 106 is processed through the source mail transfer agent 114, the email message 106 can be routed through any number of intermediate mail transfer agents 116(1-N) before arriving at a destination mail transfer agent 118. The destination mail transfer agent 118 can forward the email message 106 to the destination client device 108, or can simply route the email message 106 to an appropriate destination client mail box associated with the destination client device 108.

Various header entries are added to the email message 106 when the email message 106 is generated at client device 102, and when the email message 106 is communicated from client device 102 to the destination client device 108 via the various mail transfer agents 112. For example, the email application 104 can add origin header entries to the email message 106 when it is generated. In addition, each of the mail transfer agents 112 through which the email message 106 is routed can add a received header entry to the email message 106. As described in detail below, these various header entries that are added to an email message as it is being routed from one client device to another can be used by a spam filtering component 120 to improve the accuracy of spam filtering and detecting spam messages.

The spam filter component 120 implements embodiments of message header spam filtering and can be implemented as a component of the destination mail transfer agent 118, as a component of the destination client device 108, and/or as an independent component in a remote computing device. Although the spam filter component 120 is illustrated and described as a single application configured to implement features of email header spam filtering, the spam filter component 120 can be implemented as several component applications distributed to each perform one or more functions in a spam filtering system. Additionally, each of the client devices 102 and 108, and/or the mail transfer agents 112 may be implemented as any form of computing or electronic device with any number and combination of differing components as described below with reference to the exemplary computing environment 700 shown in FIG. 7.

FIG. 2 illustrates an example of message header entries 200. The header entries 200 are merely exemplary to illustrate various message header entries which can be included in an email message as the message is routed from one client device to another via a communication network. Some of the header entries 200 are added to the email message 106 when it is generated by the email application 104 at client device 102, while others of the message header entries are added as the email message 106 is communicated from one mail transfer agent 112 to another. The ordering of the list of header entries 200 is typically maintained so that the most recent message header entry is added at the top of the list. As such, the header entries 200 are added to the email message 106 in chronological order as the email message is communicated from client device 102 to the source mail transfer agent 114, and on to the destination client device 108 via the various mail transfer agents 116 and 118.

In this example, a set of origin header entries 202 are added to the email message 106 by the email application 104 (at client device 102) when the email message 106 is generated and communicated to the source mail transfer agent 114. This set of origin header entries 202 includes information in the form of a Date header entry 204 that describes the date and time when email message 106 was generated. The set of origin header entries 202 also includes a From header entry 206 that describes where the email message 106 is coming from, a To header entry 208 that indicates where the email message is being routed, and a Subject header entry 210 that identifies a context of the email message 106. In this example, the set of origin header entries 202 also includes a MessageID header entry 212, a Content-Type header entry 214, a Content-Transfer-Encoding header entry 216, and a Return-Path header entry 218.

Each of the origin header entries 202 are established at the level of the client device 102 when the email message 106 is generated. It should be noted that some of the origin header entries 202 can be specific to the particular email application program 104 which is used to generate the email message 106. Therefore, the origin header entries 202 included in the email message 106 in this example can vary from one email application program to another.

Moving up the list of header entries 200, a source mail transfer agent received header entry 222 is located chronologically above the set of origin header entries 202. This source mail transfer agent received header entry 222 corresponds to the source mail transfer agent 114 and is added to the list of header entries 200 when the email message 106 is received from client device 102. The source mail transfer agent received header entry 222 is the first received header entry to be added to list of email header entries 200. This source mail transfer agent received header entry 222 identifies when and from which Webmail service the email message 106 was received.

Similarly, received header entries 224 and 226 are located chronologically above received header entry 222, and correspond to respective intermediate mail transfer agents (e.g., mail transfer agents 116(1) and 116(2)). The received header entries 224 and 226 also identify when by which route the email message 106 was received.

A received header entry 228 is included in the list of header entries 200 chronologically above the received header entries 224 and 226. The received header entry 228 corresponds to a destination mail transfer agent, such as destination mail transfer agent 118 shown in FIG. 1. The destination mail transfer agent received header entry 228 is added by the destination mail transfer agent 118 to identify when it receives the email message 106 from one of the intermediate mail transfer agents 116.

In this example, the destination mail transfer agent received header entry 228 is the last header entry added to the list of email header entries 200. Therefore, when the email message 106 arrives at the destination mail transfer agent 118 it will include the origin set of header entries 202 and a set of received header entries 230 (i.e., received header entries 222, 224, 226, and 228) which were added by the mail transfer agents 112 along the communication path 110. The received email message 106 therefore includes a list of header entries 200 which are arranged in an ordered sequence that indicates a path by which the email message 106 was communicated from client device 102 to the destination client device 108.

In other examples, additional header entries may be added to the email message 106 as a result of filtering, message modification, and/or as a result of various policies which are specific to any of the mail transfer agents 112 along the communication path 110. For example, if the destination mail transfer agent 118 performs a sender identification authentication check, the results of that check could be added into a specific header of the email message 106.

The spam filter component 120 shown in FIG. 1 can receive the email message 106 which includes the list of header entries 200 arranged in an ordered sequence that indicates the path by which the email message 106 was communicated. The spam filter component 120 can then parse and categorize the header entries by type, and the specific ordering and/or quantity of the header entries can be used to implement features of email header spam filtering.

Figure 3:
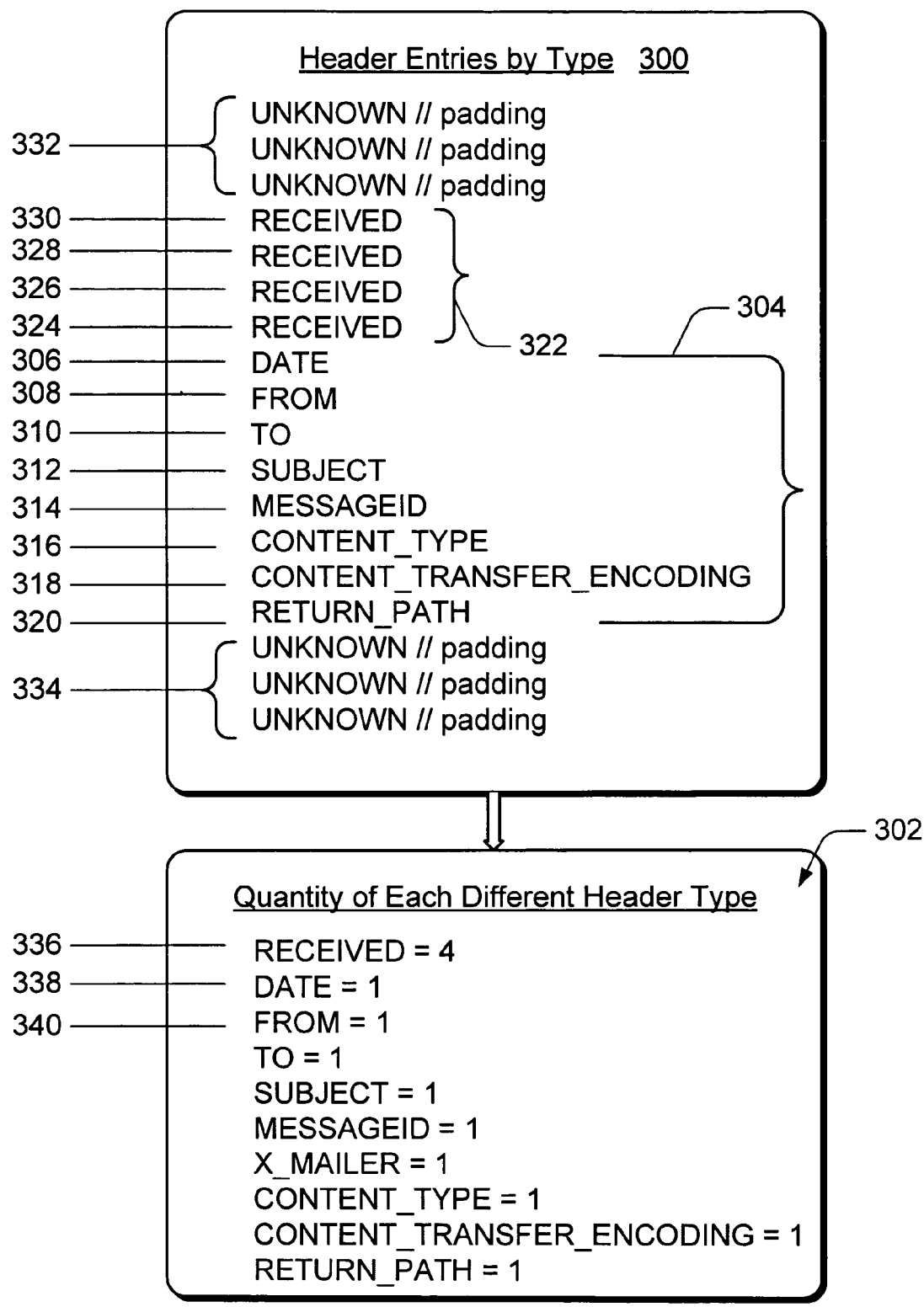
FIG. 3 illustrates a list of header entry types and a determined quantity of each different header entry type.

FIG. 3 illustrates a list of header entries by type 300 and a determined quantity 302 of each different header entry type. The list of header entry types 300 can be generated by parsing the list of header entries 200 (FIG. 2) to categorize each of the individual header entries as a header type and then listing them in the ordered sequence of the header entries 200. The header type for each of the header entries 200 is indicated by the text before the colon of each header entry, while the content of each header entry is indicated by the text which follows the colon.

In this example, the categories of message header types are parsed based on Internet standard terminology. In cases where a specific email header entry is non-standard, that email header entry is categorized as being unknown. This system of classification is provided by way of example only, as any suitable classification system can be alternatively used. Parsing the list of email header entries 200 can be accomplished by any suitable means. In one implementation, advanced message parsing engines are used to view a characterization or definition of each of the email header entries 200.

The exemplary list of message header entries 200 (FIG. 2) can be parsed and categorized to create the list of header entry types 300 (FIG. 3). The set of origin header entries 202 can be parsed to create a set of original header entries by type 304. In this example, the Date header entry 204 is categorized as a "DATE" type header 306; the From header entry 206 is categorized as a "FROM" type header 308; the To header entry 208 is categorized as a "TO" type header 310; the Subject header entry 210 is categorized as a "SUBJECT" type header 312; the MessageID header entry 212 is categorized as a "MESSAGEID" type header 314; the Content-Type header entry 214 is categorized as being a "CONTENT_TYPE" header 316; the Content-Transfer-Encoding header entry 216 is categorized as being a "CONTENT_TRANSFER_ENCODING" type header 318; and the Return-Path header entry 218 is categorized as being a "RETURN_PATH" type header 320.

Additionally, the list of header entries 200 includes the set of the mail transfer agent received header entries 230 which can be categorized as a set of "RECEIVED" type headers 322. More specifically, the source mail transfer agent received header entry 222, the intermediate mail transfer agent received header entries 224 and 226, and the destination mail transfer agent received header entry 228 can be categorized respectively as "RECEIVED" type headers 324, 326, 328, and 330.

Padding indicators 332 and 334 can be added when parsing the list of header entry types 300 to indicate a header entry position in the ordered sequence and can be used as a reference point, so that the relative position of a specific header entry can be determined. In one implementation, padding 332 and 334 is added respectively to the beginning and end of the list of header entry types 300 so that a position of a first header entry can be determined relative to the beginning and to the end of the list 300. In another implementation, padding 332 and 334 is added respectively to the beginning and end of the list of header entry types 300 so that a position of a first header entry can be determined relative to the position of a second header entry in the list 300. In some cases, a determination can be made as to whether the email message 106 is a spam message based at least in part on a header entry position in the ordered sequence of header entries.

From the parsed list of header entry types 300, a quantity of each different header type can be determined as the indicated in list 302. For example, the list of header entries by type 300 includes four. "RECEIVED" type headers 322 (i.e., "RECEIVED" type headers 324, 326, 328, and 330) as indicated in list 302 by identifier 336. The list of header entries by type 300 includes one "DATE" type header 306 which is indicated in list 302 by identifier 338. The list of header entries by type 300 includes one "FROM" type header 308 which is indicated in list 302 by identifier 340. Accordingly, the other header entries by type included in list 300 are identified in list 302 as having a quantity of one.

When a quantity of each different header type has been determined, as shown in list 302, a quantity of a particular header type can be utilized to determine whether the email message 106 is likely a spam message. For example, most email messages 106 will arrive at the destination mail transfer agent 108 after being routed through at least one other mail transfer agent (e.g., any of mail transfer agents 112). Typically, an email message will be routed through several mail transfer agents before arriving at the destination mail transfer agent 108. At each "hop" (or mail transfer agent) along the communication path 110 from client device 102 to the destination mail transfer agent 118, a "RECEIVED" type header will be added to the email message 106. As such, an email message will include more than one "RECEIVED" type header when it arrives at the destination mail transfer agent 118.

Spammers use tools to locate a particular computer, and then create individual, multiple, and even distributed sets of connections directly to a destination mail transfer agent. The result is that many spam messages which are received at a destination mail transfer agent will include only one "RECEIVED" type header (i.e., only the RECEIVED type header which is inserted by the destination mail transfer agent 116 will be included in the spam message). In other words, the quantity of RECEIVED type headers in received messages can be filtered to differentiate legitimate email messages (i.e., those which have a "RECEIVED" header type quantity>1) from spam messages (i.e., those which have a "RECEIVED" header type quantity=1). Alternatively, a combination of two or more quantities of different header types can be utilized to determine whether an email message is likely a spam message.

Figure 4:
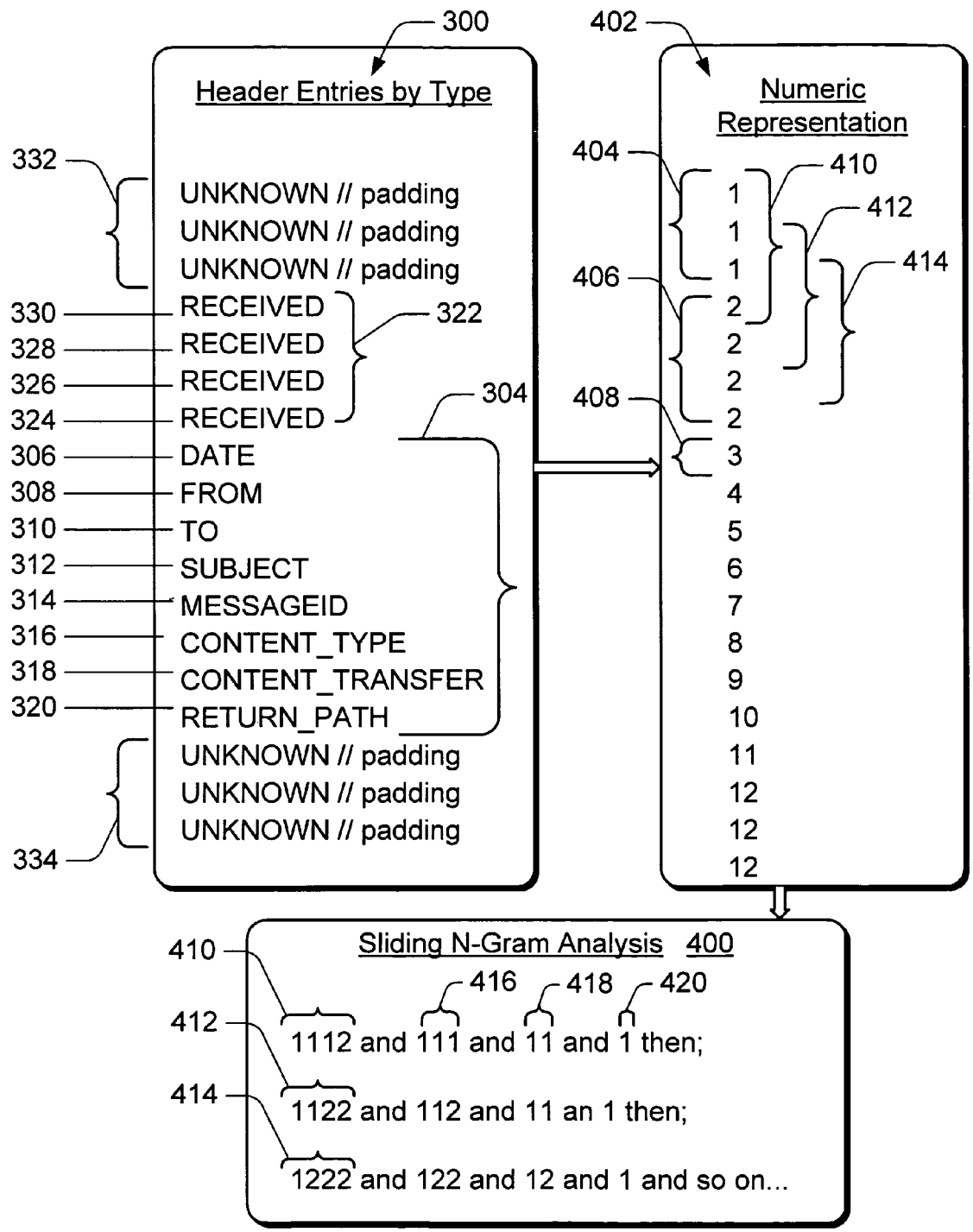
FIG. 4 illustrates a list of header entry types, a corresponding numeric representation, and an exemplary n-gram analysis.

FIG. 4 shows an exemplary n-gram analysis 400 of a numeric representation 402 that corresponds to the list of header entries by type 300 shown in FIG. 3. The list of header entry types 300 can first be used to create the numeric representation 402 of the ordered sequence of header types 300. The numeric representation 402 includes unique integers which are assigned to each different header type. The unique integers are assigned as a way to digitize the header entry types 300. For example, the first three listed header entries 332 are of the "UNKNOWN//padding" type. In this example, the number one is assigned at 404 as the unique integer that represents each of these first three listed header entries 332.

The next four listed header entries 322 (i.e., which includes header entries 324, 326, 328, and 330) are of the "RECEIVED" header type. In this example, the number two is assigned at 406 as the unique integer that represents each of these four listed header entries 322. Reading down the list of header entries by type 300, the next listed header entry is the "DATE" header type 306. In this example, the number three is assigned at 408 as the unique integer that represents the header type 306. The same technique for unique integer assignment is continued for the remaining list of header entries by type 300 as shown in numeric representation 402. When the numeric representation 402 has been generated, the numeric representation can be utilized to determine whether the email message 106 is likely a spam message based at least in part on the numeric representation 402 of the ordered sequence of header types 300.

In one implementation, a determination can be made as to whether the email message 106 is likely a spam message based at least in part on a sampling of multiple sequential overlapping segments of the numeric representation 402. For example a "window", or segment, of four consecutively listed integers can be used to sample the numeric representation 402. Here, a first segment 410 of the numeric representation 402 is sampled which includes the set of integers {1-1-1-2}. Next, a second segment 412 of the numeric representation 402 is sampled which includes the set of integers {1-1-2-2}. The second segment 420 overlaps the first segment 410 such that the two sampled segments share a subset of three consecutively listed and common integers {1-1-2}. Next, a third segment 414 of the numeric representation 402 is sampled which includes the set of integers {1-2-2-2}. Similarly, the third segment 414 overlaps the first segment 410 such that the two sampled segments share a subset of two consecutively listed and common integers {1-2}, and the third segment 414 overlaps the second segment 412 such that the two sampled segments share a subset of three consecutively listed and common integers {1-2-2}. Additional sequential overlapping segments of the numeric representation 402 can also be similarly sampled progressing through the numeric representation 402.

In another implementation, a determination can be made as to whether the email message 106 is likely a spam message based at least in part on a sliding n-gram analysis 400 of the numeric representation 402. In this example n-gram analysis 402, a window, or segment, of four consecutively listed integers can be used to sample the numeric representation 402 and extract the first segment 410, the second segment 412, and the third segment 414. Each of these extracted segments can then be further examined. For example, the first segment 410 initially includes the set of four integers {1-1-1-2}. The window can then be narrowed to focus on a subset of three of the integers {1-1-1} 416, or a subset of two of the integers {1-1} 418, and/or on a subset of one of the integers {1} 420. The second segment 412 and the third segment 414 can be similarly examined, as can additional segments that are extracted from the numeric representation 402.

The sliding n-gram analysis 400 provides a series of "snap shots" for each of the extracted segments (e.g., the first, second, and third segments (410, 412, and 414), and any additional segments). Each set of four integers (which represent the header types) can be considered a feature, and these features can be input to a computer learning algorithm where they are used as part of an overall heuristic gathering process. By defining and extracting a heuristic from the message header entries 200, the computer learning algorithm can learn to identify patterns and/or quantities which are indicative of spam messages, and is therefore able to more accurately differentiate between a legitimate email message and a spam email message. In other words, the computer learning algorithm can use the "snap shots" provided by the n-gram analysis 400 to learn what the header entries of a legitimate email message look like and what the header entries of a spam email message look like, and to differentiate between the two. The identification of a spam message can be based on the quantity corresponding to one ore more specific header types, on data extracted from the numeric representation, and/or on data from both the quantity and the numeric representation.

When a computer learning algorithm is used to determine whether the an email message is likely a spam message, the computer learning algorithm can compare the determined quantity of each different header type 302, and/or the numeric representation 400 corresponding to the ordered sequence of header types 300, to a reference which has been established by the computer learning algorithm. To establish the reference, the computer learning algorithm can analyze data from additional email messages to determine which quantities corresponding to respective header types, and which numeric representations corresponding to the ordered sequence of header types, indicate a likelihood that a message is a spam message.

Methods for message header spam filtering, such as exemplary methods 500 and 600 described with reference to respective FIGS. 5 and 6, may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

Figure 5:
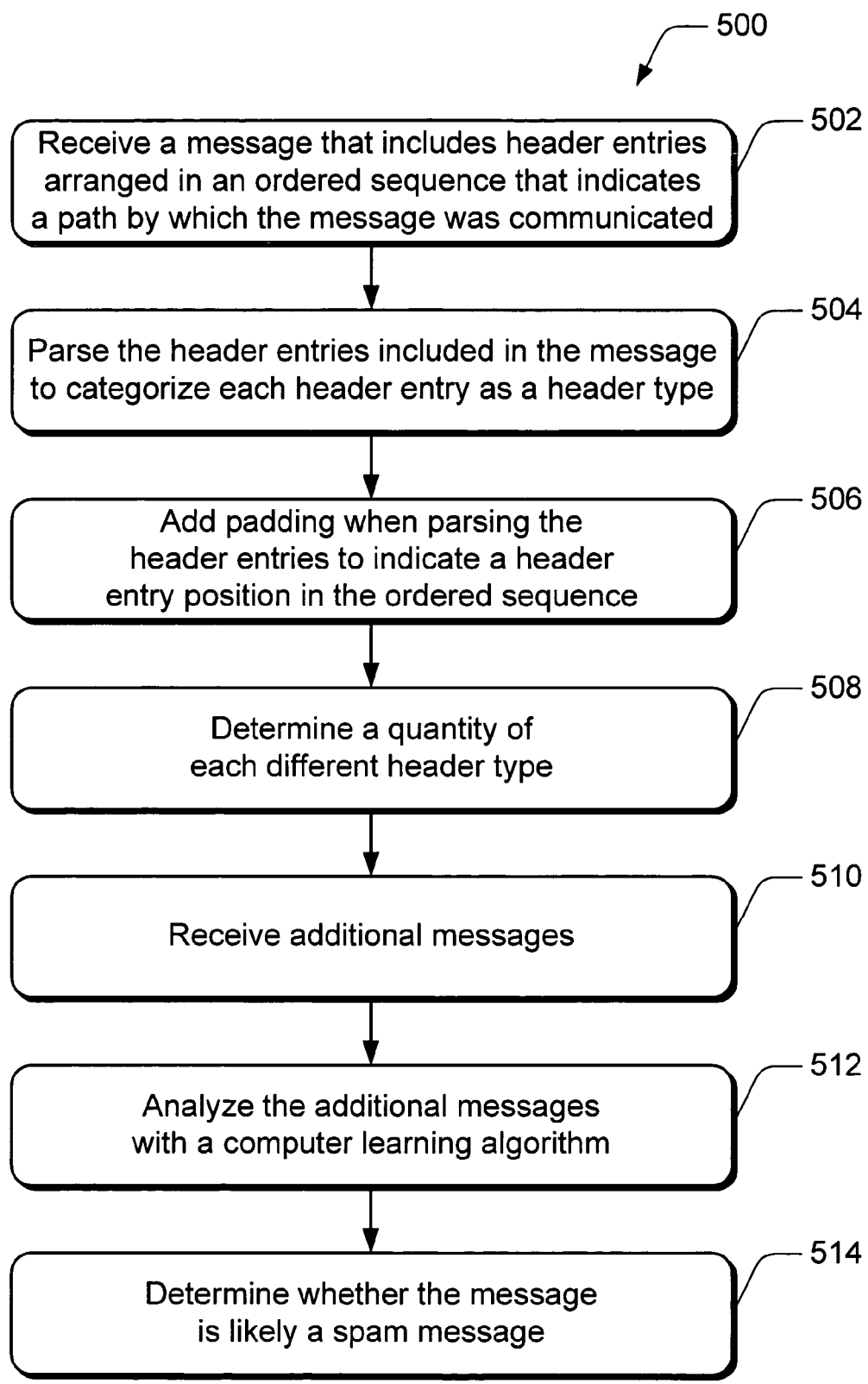
FIG. 5 illustrates an exemplary method for message header spam filtering.

FIG. 5 illustrates an exemplary method 500 for message header spam filtering. The order in which the method is described is not intended to be construed as a limitation, and any number of the described method blocks can be combined in any order to implement the method. Furthermore, the method can be implemented in any suitable hardware, software, firmware, or combination thereof.

At block 502, a message is received that includes header entries arranged in an ordered sequence that indicates a path by which the message was communicated. For example, an email message 106 is communicated from client device 102, through a series of mail transfer agents 112, and finally to the destination client device 108. The header entries 200 are arranged in chronological order (e.g., an ordered sequence) that indicates the communication path 110 via which the email message 106 was communicated. At block 504, the header entries included in the message are parsed to categorize each header entry as a header type. For example, the spam filter component 118 parses the email header entries 200 to generate the list of header entries by type 300 where the header types are listed in the ordered sequence.

At block 506, padding is added when parsing the header entries to indicate a header entry position in the ordered sequence. For example, padding 332 and 334 can be added respectively to the top and bottom of the list of email header entries by type 300 to indicate a header entry position in the ordered sequence. At block 508, a quantity of each different header type is determined. For example, as shown in the list of quantity for each different header type 302, the quantity of "RECEIVED" type header entries can be determined to be four (at identifier 336).

At block 510, additional messages are received, and at block 512, the additional messages are analyzed with a computer learning algorithm. The additional messages are analyzed to establish a reference by which to determine which quantities corresponding to the respective header types indicate a likelihood of a spam message. At block 514, a determination is made as to whether the message is likely a spam message. The determination can be based at least in part on the quantity corresponding to a particular header type, a combination of any two or more of the quantities corresponding to the different header types, on the header entry position in the ordered sequence, by comparing the quantity of a particular header type to an established reference of the computer learning algorithm, and/or on any combination thereof.

Figure 6:
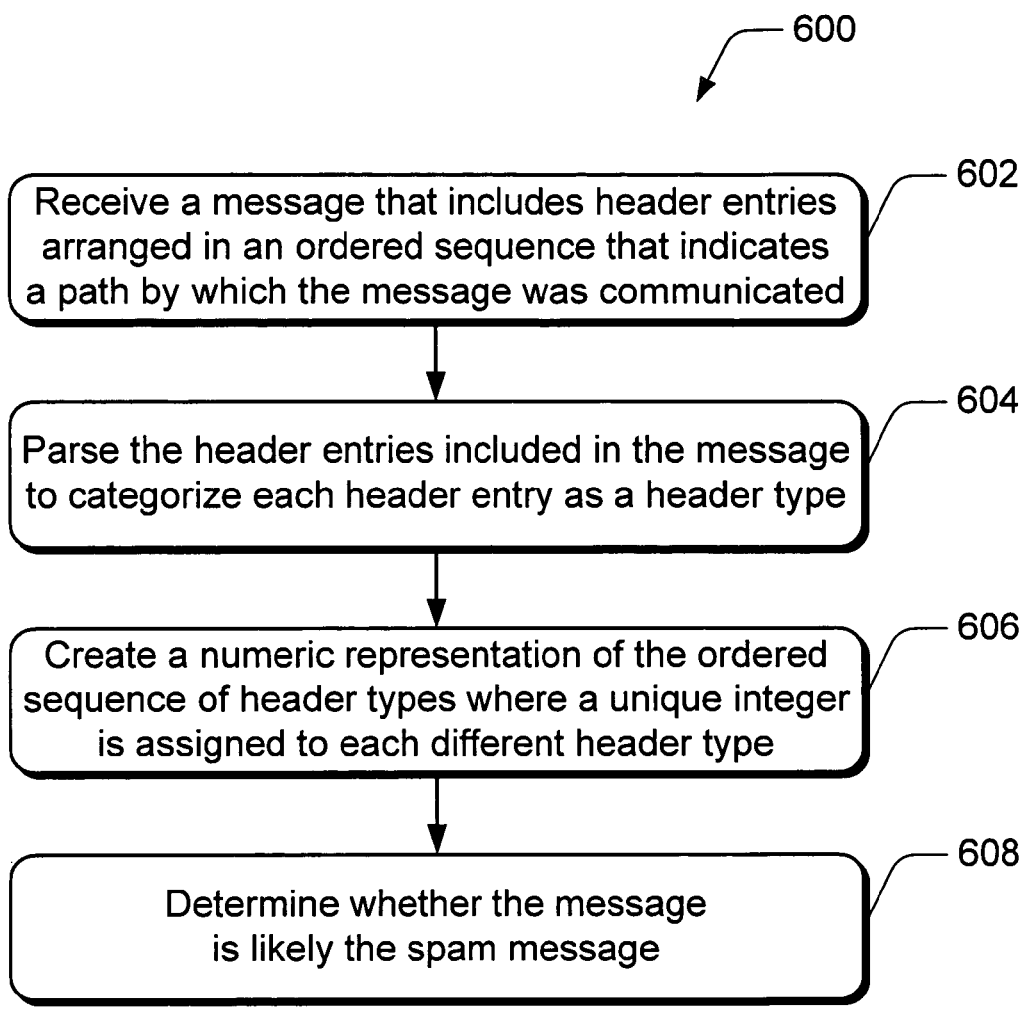
FIG. 6 illustrates another exemplary method for message header spam filtering.

FIG. 6 illustrates an exemplary method 600 for message header spam filtering. The order in which the method is described is not intended to be construed as a limitation, and any number of the described method blocks can be combined in any order to implement the method. Furthermore, the method can be implemented in any suitable hardware, software, firmware, or combination thereof.

At block 602, a message is received that includes header entries arranged in an ordered sequence that indicates a path by which the message was communicated. For example, an email message 106 is communicated from client device 102, through a series of mail transfer agents 112, and finally to the destination client device 108. The header entries 200 are arranged in chronological order (e.g., an ordered sequence) that indicates the communication path 110 via which the email message 106 was communicated.

At block 604, the header entries included in the message are parsed to categorize each header entry as a header type. For example, the spam filter component 118 parses the email header entries 200 to generate the list of header entries by type 300 where the header types are listed in the ordered sequence. At block 606, a numeric representation of the ordered sequence of header types is created, and a unique integer is assigned to each different header type. For example, the list of header types 300 is created and a unique integer is assigned to each different header type as shown by the numeric representation 402.

At block 608, a determination is made as to whether the message is likely a spam message. The determination can be based at least in part: on the numeric representation of the ordered sequence of header types; on a sampling of multiple sequential-overlapping segments of the numeric representation; on an n-gram analysis of the numeric representation; on a sliding n-gram analysis of the numeric representation; on identifying at least one of an order of the header entries or a pattern of the header entries indicative of the spam message; and/or on providing a sampling of multiple sequential-overlapping segments of the numeric representation to a computer learning algorithm for identification of patterns indicative of a spam message.

It should be noted that any of the method blocks described with reference to FIG. 6 can be combined in any order with any of the method blocks described with reference to FIG. 5. For example, block 508 can be included in method 600 to determine a quantity of each different header type. As another example, block 506 can be included in method 600 to add padding when parsing the header entries to indicate a header entry position in the ordered sequence.

Figure 7:
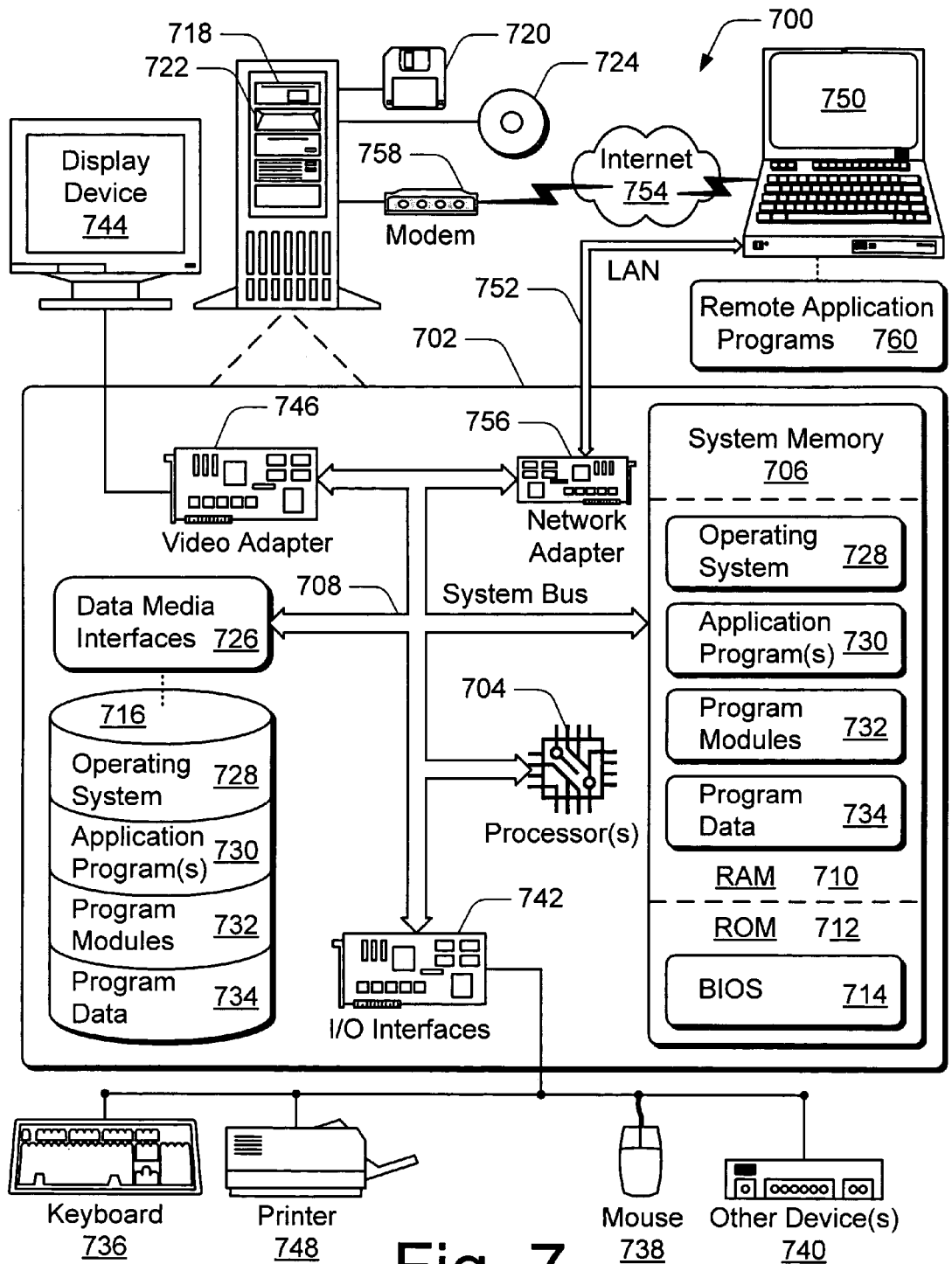
FIG. 7 illustrates exemplary computing systems, devices, and components in an environment that message header spam filtering can be implemented.

FIG. 7 illustrates an exemplary computing environment 700 within which message header spam filtering systems and methods, as well as the computing, network, and system architectures described herein, can be either fully or partially implemented. Exemplary computing environment 700 is only one example of a computing system and is not intended to suggest any limitation as to the scope of use or functionality of the architectures. Neither should the computing environment 700 be interpreted as having any dependency or requirement relating to any one or combination of components illustrated in the exemplary computing environment 700.

The computer and network architectures in computing environment 700 can be implemented with numerous other general purpose or special purpose computing, system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 700 includes a general-purpose computing system in the form of a computing device 702. The components of computing device 702 can include, but are not limited to, one or more processors 704 (e.g., any of microprocessors, controllers, and the like), a system memory 706, and a system bus 708 that couples the various system components. The one or more processors 704 process various computer executable instructions to control the operation of computing device 702 and to communicate with other electronic and computing devices. The system bus 708 represents any number of several types of bus structures, including a memory bus or memory controller, a peripheral bus, an accelerated graphics port, and a processor or local bus using any of a variety of bus architectures.

Computing environment 700 includes a variety of computer readable media which can be any media that is accessible by computing device 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714 maintains the basic routines that facilitate information transfer between components within computing device 702, such as during start-up, and is stored in ROM 712. RAM 710 typically contains data and/or program modules that are immediately accessible to and/or presently operated on by one or more of the processors 704.

Computing device 702 may include other removable/non-removable, volatile/non-volatile computer storage media. By way of example, a hard disk drive 716 reads from and writes to a non-removable, non-volatile magnetic media (not shown), a magnetic disk drive 718 reads from and writes to a removable, non-volatile magnetic disk 720 (e.g., a "floppy disk"), and an optical disk drive 722 reads from and/or writes to a removable, non-volatile optical disk 724 such as a CD-ROM, digital versatile disk (DVD), or any other type of optical media. In this example, the hard disk drive 716, magnetic disk drive 718, and optical disk drive 722 are each connected to the system bus 708 by one or more data media interfaces 726. The disk drives and associated computer readable media provide non-volatile storage of computer readable instructions, data structures, program modules, and other data for computing device 702.

Any number of program modules can be stored on RAM 710, ROM 712, hard disk 716, magnetic disk 720, and/or optical disk 724, including by way of example, an operating system 728, one or more application programs 730, other program modules 732, and program data 734. Each of such operating system 728, application program(s) 730, other program modules 732, program data 734, or any combination thereof, may include one or more embodiments of the systems and methods described herein.

Computing device 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 702 via any number of different input devices such as a keyboard 736 and pointing device 738 (e.g., a "mouse"). Other input devices 740 (not shown specifically) may include a microphone, joystick, game pad, controller, satellite dish, serial port, scanner, and/or the like. These and other input devices are connected to the processors 704 via input/output interfaces 742 that are coupled to the system bus 708, but may be connected by other interface and bus structures, such as a parallel port, game port, and/or a universal serial bus (USB).

A display device 744 (or other type of monitor) can be connected to the system bus 708 via an interface, such as a video adapter 746. In addition to the display device 744, other output peripheral devices can include components such as speakers (not shown) and a printer 748 which can be connected to computing device 702 via the input/output interfaces 742.

Computing device 702 can operate in a networked environment using logical connections to one or more remote computers, such as remote computing device 750. By way of example, remote computing device 750 can be a personal computer, portable computer, a server, a router, a network computer, a peer device or other common network node, and the like. The remote computing device 750 is illustrated as a portable computer that can include any number and combination of the different components, elements, and features described herein relative to computing device 702.

Logical connections between computing device 702 and the remote computing device 750 are depicted as a local area network (LAN) 752 and a general wide area network (WAN) 754. Such networking environments are commonplace in offices, enterprise-wide computer networks, intranets, and the Internet. When implemented in a LAN networking environment, the computing device 702 is connected to a local network 752 via a network interface or adapter 756. When implemented in a WAN networking environment, the computing device 702 typically includes a modem 758 or other means for establishing communications over the wide area network 754. The modem 758 can be internal or external to computing device 702, and can be connected to the system bus 708 via the input/output interfaces 742 or other appropriate mechanisms. The illustrated network connections are merely exemplary and other means of establishing communication link(s) between the computing devices 702 and 750 can be utilized.

In a networked environment, such as that illustrated with computing environment 700, program modules depicted relative to the computing device 702, or portions thereof, may be stored in a remote memory storage device. By way of example, remote application programs 760 are maintained with a memory device of remote computing device 750. For purposes of illustration, application programs and other executable program components, such as operating system 728, are illustrated herein as discrete blocks, although it is recognized that such programs and components reside at various times in different storage components of the computing device 702, and are executed by the one or more processors 704 of the computing device 702.

Although embodiments of message header spam filtering have been described in language specific to structural features and/or methods, it is to be understood that the subject of the appended claims is not necessarily limited to the specific features or methods described. Rather, the specific features and methods are disclosed as exemplary implementations of message header spam filtering.

The invention claimed is:

1. A method for filtering spam, the method comprising:
    receiving a message that includes header entries arranged in an ordered sequence that indicates a path by which the message was communicated;
    parsing the header entries included in the message to categorize each header entry as a header type where the header types are listed in the ordered sequence, wherein a header type is comprised of text of a header entry found before a colon in the header entry, wherein parsing includes listing the header types included in the message in the ordered sequence;
    determining a quantity of each different header type;
    creating a numeric representation of the ordered sequence of header types, the numeric representation including a unique integer assigned to each different header type;
    receiving one or more additional messages, wherein each additional message has one or more header entries;
    analyzing the header entries of the one or more additional messages with a computer learning algorithm to establish a reference by determining which one or more quantities of header types indicate a likelihood of a spam message, wherein each quantity corresponds to a respective header type, and wherein each respective header type corresponds to a respective header entry; and
    determining whether the message is likely a spam message based at least in part on the quantity corresponding to a particular header type of the message by comparing the quantity corresponding to the particular header type to the established reference of the computer learning algorithm, and at least in part on a sampling of multiple sequential-overlapping segments of the numeric representation of the ordered sequence.

2. A method as recited in claim 1 wherein determining whether the message is likely the spam message is based at least in part on a combination of the quantities corresponding to the different header types.

3. A method as recited in claim 1 further comprising adding padding to a list of header types when parsing the header entries to indicate a header entry position relative to the ordered sequence of the numerical representation.

4. A method as recited in claim 3 further comprising determining whether the message is likely the spam message based at least in part on the header entry position relative to the ordered sequence.

5. A method for filtering spam, the method comprising:
    receiving a message that includes header entries arranged in an ordered sequence that indicates a path by which the message was communicated;
    parsing the header entries included in the message to categorize each header entry as a header type where the header types are listed in the ordered sequence, wherein a header type is comprised of text of a header entry found before a colon in the header entry;
    creating a numeric representation of the ordered sequence of header types, the numeric representation including a unique integer assigned to each different header type;
    receiving one or more additional messages, wherein each additional message has one or more header entries;
    analyzing the header entries of the one or more additional messages with a computer learning algorithm to establish a reference, wherein the reference indicates a likelihood of a spam message; and
    determining whether the message is likely a spam message based at least in part on the numeric representation of the ordered sequence of header types of the message by comparing the numeric representation of the message, corresponding to the ordered sequence of header types, to the reference, and at least in part on a sampling of multiple sequential-overlapping segments of the numeric representation of the ordered sequence.

6. A method as recited in claim 5 wherein parsing the header entries includes marking a header entry as "unknown" when such header entry is determined to be a non-standard header entry.

7. A method as recited in claim 5 wherein determining whether the message is likely the spam message is based at least in part on an n-gram analysis of the numeric representation.

8. A method as recited in claim 5 wherein determining whether the message is likely the spam message is based at least in part on a sliding n-gram analysis of the numeric representation.

9. A method as recited in claim 5 wherein determining whether the message is likely the spam message is based on identifying at least one of an order of the header entries or a pattern of the header entries indicative of the spam message.

10. A method as recited in claim 5 wherein analyzing the header entries of the one or more additional messages comprises:
- parsing header entries included in each of the one or more additional messages;
- categorizing each header entry as a header type where the header types are listed in an ordered sequence that indicates a path by which the corresponding additional message was communicated; and
- creating a numeric representation of the ordered sequence of header types for each corresponding additional message, wherein the numeric representation for each corresponding additional message includes a unique integer assigned to each different header type.

11. A method as recited in claim 5 farther comprising:
- determining a quantity of each different header type for the message and for one or more of the additional messages; and
- determining whether the message is likely the spam message based on at least one of the quantity corresponding to a particular header type, or a combination of the quantities corresponding to the different header types.

12. A method as recited in claim 5 further comprising:
- adding padding to a list of header types when parsing the header entries to indicate a header entry position in the ordered sequence;
- assigning at least one padding as a reference point for use in finding a relative position of a specific header entry; and
- determining whether the message is likely the spam message based at least in part on the header entry position in the ordered sequence.

13. One or more computer readable storage media comprising computer executable instructions that, when executed, direct a computing device to perform acts comprising:
- receive an email message that includes header entries arranged in an ordered sequence that indicates a path by which the email message was communicated;
- parse the header entries included in the email message to categorize each header entry as a header type where the header types are listed in the ordered sequence, wherein a header type is comprised of text of a header entry found before a colon in the header entry;
- determine a quantity of each different header type;
- create a numeric representation of the ordered sequence of header types, the numeric representation including unique integers assigned to each different header type;
- receive one or more additional messages, wherein each additional message has one or more header entries;
- analyze the header entries of the one or more additional messages with a computer learning algorithm to establish a reference, wherein the reference indicates a likelihood of a spam message; and
- determine whether the email message is likely a spam message based on at least one of the numeric representation of the ordered sequence of header types of the message by comparing the numeric representation of the message, corresponding to the ordered sequence of header types, to the reference, and at least in part on a sampling of multiple sequential-overlapping segments of the numeric representation of the ordered sequence.

14. One or more computer readable storage media as recited in claim 13, further comprising computer executable instructions that, when executed, direct the computing device to determine whether the email message is likely the spam message based on both the numeric representation of the ordered sequence of header types and the quantity corresponding to the particular header type.

15. One or more computer readable storage media as recited in claim 13, further comprising computer executable instructions that, when executed, direct the computing device to perform acts comprising:
- add padding when parsing the header entries to indicate a header entry position in the ordered sequence; and
- determine whether the message is likely the spam message based at least in part on the header entry position in the ordered sequence.

16. One or more computer readable storage media as recited in claim 13, further comprising computer executable instructions that, when executed, direct a computing device to apply an n-gram analysis to the numeric representation to identifying patterns indicative of the spam message.

17. One or more computer readable storage media as recited in claim 13, further comprising computer executable instructions that, when executed, direct the computing device to sample multiple sequential-overlapping segments of the numeric representation to identify patterns indicative of the spam message.

18. One or more computer readable storage media as recited in claim 13, further comprising computer executable instructions that, when executed, direct the computing device to evaluate the quantities of each of the different header entry types to identify quantities of header entry types each of which deviates from a corresponding spam indicator header type value, as taken from one or more of the additional message, wherein a combination of two or more quantities of deviations from corresponding spam indicator header type values is indicative of the spam message.

19. One or more computer readable storage media as recited in claim 13, further comprising computer executable instructions that, when executed, direct the computing device to determine whether the message is likely the spam message based on an order of the header entries indicative of the spam message.

* * * * *